(12) United States Patent
Chang (10) Patent No.: US 7,155,788 B1
(45) Date of Patent: Jan. 2, 2007

(54) C-AXIS DRIVING DEVICE OF A COMPUTER NUMERICAL CONTROLLED LATHING AND MILLING MACHINE

(75) Inventor: Wen-Yu Chang, Taichung (TW)

(73) Assignee: Leadjeck Automation Co., Ltd., Taichung (TW)

( * ) Notice: Subject to any disclaimer, the term of this patent is extended or adjusted under 35 U.S.C. 154(b) by 0 days.

(21) Appl. No.: 11/200,022

(22) Filed: Aug. 10, 2005

(51) Int. Cl.
 *B23P 23/00* (2006.01)
 *B23C 1/14* (2006.01)

(52) U.S. Cl. .................. 29/27 C; 409/165; 409/221; 82/156; 82/165; 82/162; 474/148

(58) Field of Classification Search ............... 29/27 C, 29/27 R; 409/165, 221; 408/23, 71; 82/156, 82/143, 165, 166, 162; 474/148, 159, 168, 474/170, 171, 70
See application file for complete search history.

(56) References Cited

U.S. PATENT DOCUMENTS

| | | | | |
|---|---|---|---|---|
| 3,460,435 A | * | 8/1969 | Dahl et al. | 409/183 |
| 3,587,390 A | * | 6/1971 | Lohneis et al. | 409/221 |
| 4,763,549 A | * | 8/1988 | Hata et al. | 82/124 |
| 4,829,861 A | * | 5/1989 | Brown et al. | 82/142 |
| 4,951,376 A | * | 8/1990 | Grund | 29/27 C |
| 5,020,201 A | * | 6/1991 | Kitamura | 29/27 C |
| 6,081,980 A | * | 7/2000 | Lunn | 29/50 |
| 6,352,496 B1 | * | 3/2002 | Oldani | 409/165 |
| 6,886,225 B1 | * | 5/2005 | Pasquetto | 29/27 C |

* cited by examiner

*Primary Examiner*—Erica Cadugan
(74) *Attorney, Agent, or Firm*—Troxell Law Office, PLLC (57) ABSTRACT

A C-axis driving device of a computer numerical controlled (CNC) lathing and milling machine includes a spindle, an encoder, a spindle motor, and a servo motor. The spindle has a clamping device and a transmission portion. This encoder connects with the transmission portion via an auxiliary timing belt. The spindle motor and the servo motor connect with the transmission portion via at least one driving timing belt. Only at most one of the spindle motor and the servo motor is to drive this transmission portion at any time during operation. So, it has a simple structure to achieve the clutching change function. It can save more space. And, it can significantly reduce the manufacturing cost.

7 Claims, 8 Drawing Sheets

C-AXIS DRIVING DEVICE OF A COMPUTER NUMERICAL CONTROLLED LATHING AND MILLING MACHINE

BACKGROUND OF INVENTION

1. Field of the Invention

The present invention relates to a C-axis driving device of a computer numerical controlled (or briefly called CNC) lathing and milling machine. Particularly, by easily switching the spindle motor and the servo motor as started (there are torque output) or released (no torque output), it can achieve both the lathing work and the milling work on this CNC machine.

2. Description of the Prior Art

Figure 7:
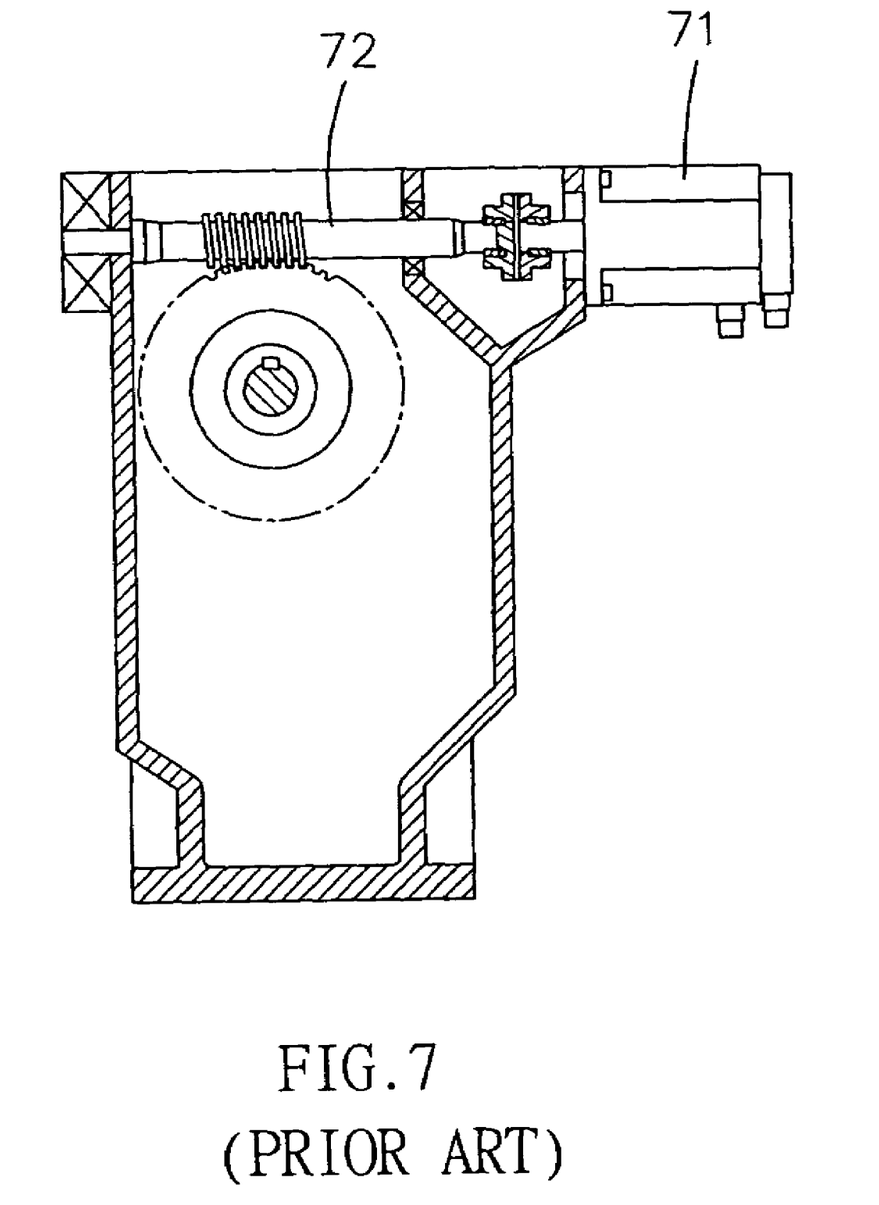
FIG. 7 illustrates a traditional C-axis driving device of a CNC lathing and milling machine.

One of the traditional C-axis driving device of a computer numerical controlled (or briefly called CNC) lathing and milling machines can be seen in FIG. 7. With regard to the C-axis driving device, a conventional servo motor 71 is disposed above a spindle of a housing. Also, a double-lead worm 72 driven by the conventional servo motor 71 is disposed on this housing. All the description about other related elements is omitted here. The first disadvantage is that its structure is too complicated. In addition, because its switch action is based on direct contact with a gear (or worm), a back-lash problem occurs. Therefore, due to such back-lash, when a user control this CNC machine to drive the C-axis system, it cannot move to a desired position nor mill a profile of a work piece very precisely. So, such conventional device is not commonly-used now.

In addition, some company develops another kind of servo motor that can be used as a spindle motor too. But, such servo motor cannot meet the requirements of high speed and large torque output (for lathing work) and precise positioning control (for milling work).

Furthermore, there is a combined spindle motor (not shown, such as the model No. αP18i of FANUC company). It contains the characteristics of high speed and large torque output (for lathing work) as well as the precise positioning control (for milling work). However, such combined spindle motor is extremely expensive and it only can be controlled by the CNC controller made by the FANUC company. Thus, the manufactures in this industry cannot use other lower-priced CNC controller (not made by FANUC company) to control this kind of combined spindle motor. Therefore, there is a widely need for this industry to develop a new C-axis driving device to solve he above-mentioned problems.

SUMMARY OF THE INVENTION

The primary object of the present invention is to provide a C-axis driving device of a computer numerical controlled lathing and milling machine. It has a simple structure to achieve the clutching change function. Also, it can meet the requirements of high speed and large torque output (for lathing work) as well as the precise positioning control (for milling work).

The next object of the present invention is to provide a C-axis driving device of a computer numerical controlled lathing and milling machine that saves more space.

Another object of the present invention is to provide a C-axis driving device of a computer numerical controlled lathing and milling machine. It can significantly reduce the manufacturing cost.

In order to achieve the above-mentioned objects, the present invention is provided.

A C-axis driving device of a computer numerical controlled lathing and milling machine comprising:

a spindle having a clamping device and a transmission portion;

an encoder connecting with a transmission portion via an auxiliary timing belt;

a spindle motor and a servo motor connecting with said transmission portion via at least one driving timing belt, said transmission portion being driven by at most one of said spindle motor and said servo motor at any time during operation.

DETAILED DESCRIPTION OF THE PREFERRED EMBODIMENT

Referring to FIGS. 1, 2, 3A and 3B, the present invention is a C-axis driving device of a computer numerical controlled (briefly called CNC) lathing and milling machine. It mainly comprises a spindle 10, an encoder 20, a spindle motor 30, and a servo motor 40.

Figure 1:
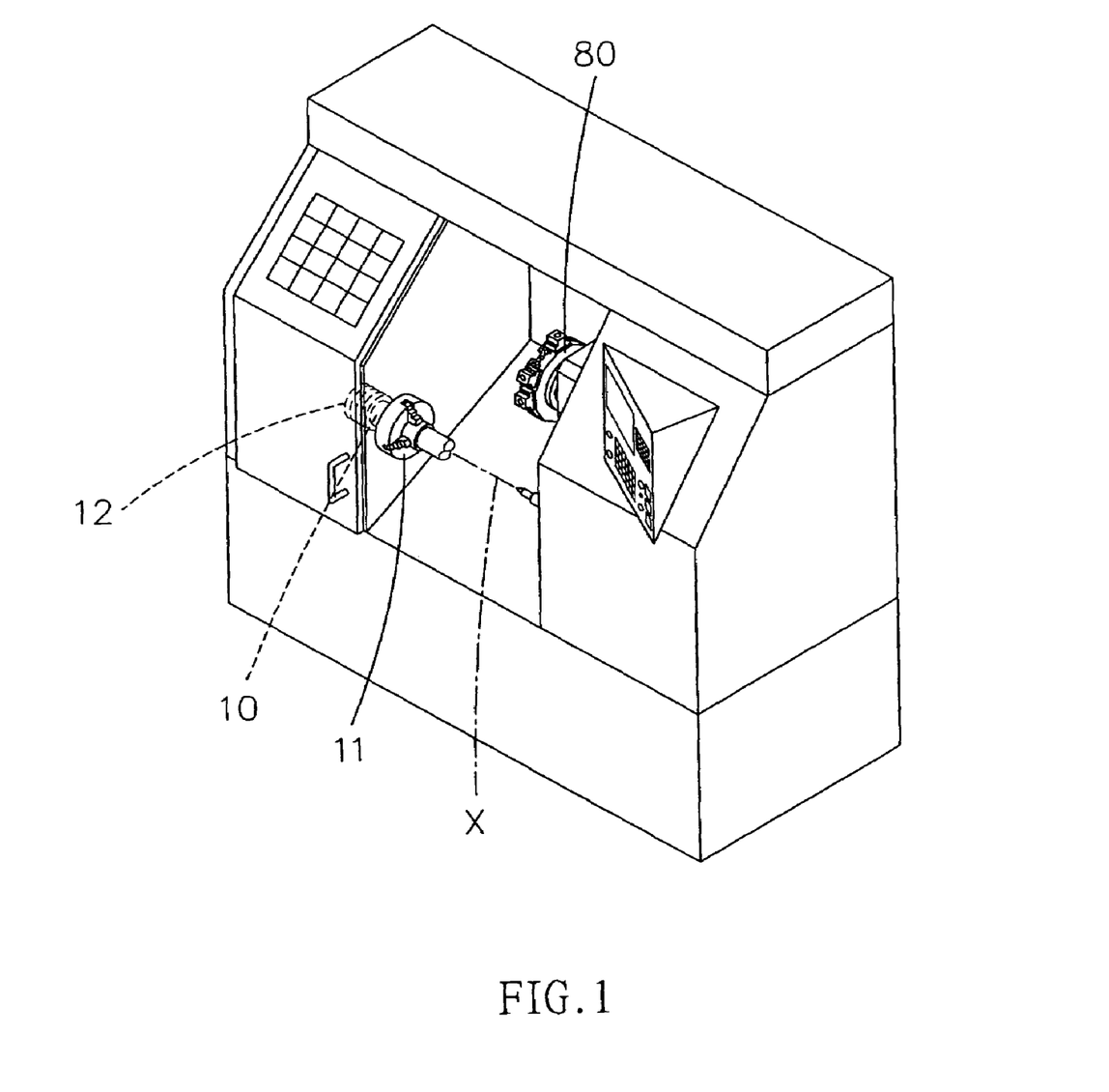
FIG. 1 is a perspective view of the present invention.

About this spindle 10, it has a clamping device 11 (for clamping a work piece 90) and a transmission portion 12. When this transmission portion 12 is driven and rotated, the spindle 10 and the clamped work piece 90 (shown by the phantom line) will rotate along a central axis X.

Concerning this encoder 20, it connects with the transmission portion 12 via an auxiliary timing belt 21. It can precisely detect the actual position or angle of the spindle 10 and the clamped work piece 90 and then send out the data to a controller of this CNC machine.

With regard to the spindle motor 30, it includes a first clutch 31. This first clutch 31 connects with a driving timing belt 43A first. Also, this driving belt 43A connects with the transmission portion 12.

The servo motor 40 includes a speed reduction mechanism 41. This speed reduction mechanism 41 connects with a second clutch 42. The second clutch 42 connects with said transmission portion 12 via an auxiliary timing belt 43B. In this preferred embodiment, the speed reduction mechanism 41 is a planetary gear reduction mechanism.

In any time during operation, at most one of the first clutch 31 and the second clutch 42 is kept closed. It means they are avoided to become the condition of both closed.

In addition, a rotary tool turret 80 is disposed on a base (not shown) that is moveable on X-axis and on Z-axis. So, this rotary tool turret 80 can move to the left or to the right, and move forward or backward. Therefore, a tool unit 81 on this rotary tool turret 80 can carry on a specific machining process (such as cutting, milling, or drilling) on this work piece 90.

Figure 3A:
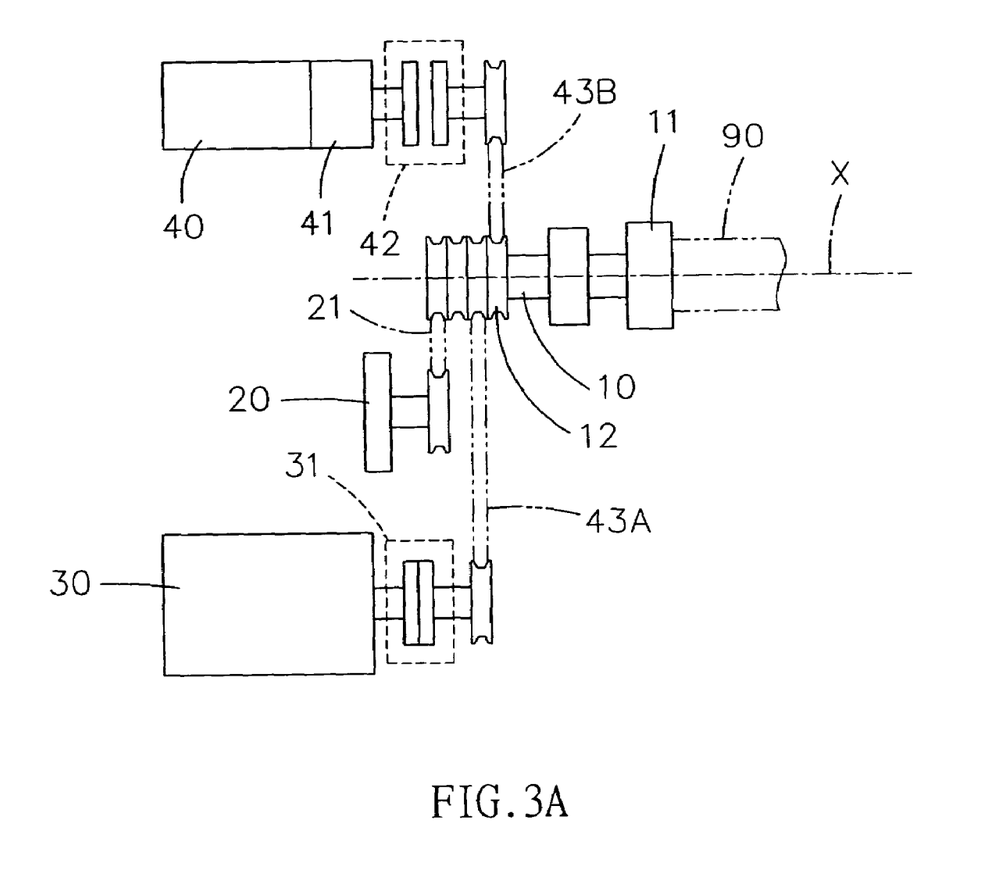
FIG. 3A and FIG. 3B are the views showing the actual operation processes of the first preferred embodiment of the present invention.
Figure 3B:
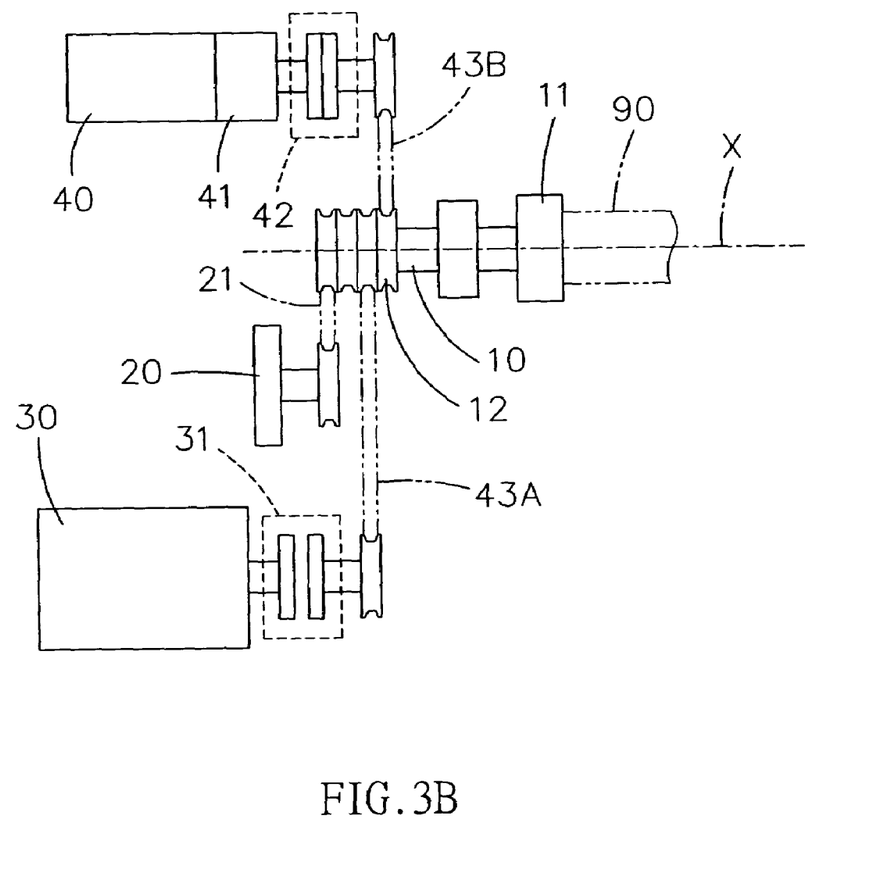

As illustrated in FIGS. 3A and 3B, they show an example of the actual operation for machining one work piece 90. The steps are described as follows:

First of all, the spindle 10 must return to its original point (or position). At this moment, the spindle motor 30 is kept released. The servo motor 40 is started. As shown in FIG. 3B, now it is switched to the servo motor 40 as the power source to drive the driving timing belt 43B. This driving timing belt 43B connects with (also driving) the transmission portion 12. This transmission portion 12 drives the spindle 10 to rotate to complete the returning to its original point. Then, one operator can carry on the lathing or milling procedure.

If this operator wants to lathe this work piece 90, the work piece 90 should be clamped on the clamping device 11 firmly. Then, the servo motor 40 is kept released. Then, the operator starts the spindle motor 30, as shown in FIG. 3A. At this moment, it is switched to the spindle motor 30 as the power source to drive the driving timing belt 43A. Meanwhile, the driving timing belt 43A also connects with (and driving) the transmission portion 12 and then drives the spindle 10 to rotate at a predetermined speed to conduct a lathing work.

Figure 2:
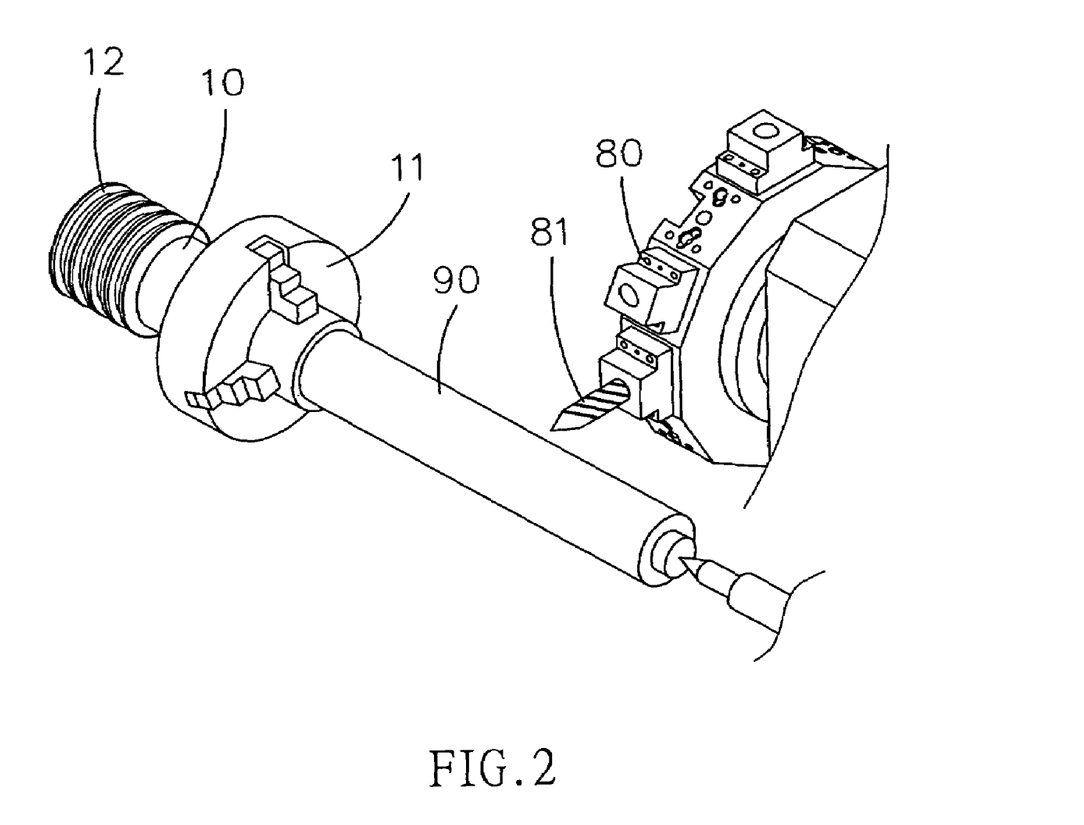
FIG. 2 shows the basic C-axis machining condition.

If the operator wants to drill a hole or to mill a surface on the lathed work piece 90, this operator can switch the power source to the servo motor 40 to drive the spindle 10 rotating to a specific position precisely. Then, the operator can select a suitable tool unit 81 (such as a drill or other tool) on the rotary tool turret 80 to drilling work or other works (such as cutting, milling, etc.) as shown in FIG. 2. Of course, the work piece 90 can be machined on X-axis, Z-axis or C-axis. This is the "C-axis working" in the CNC machining field.

Moreover, during the lathing work (see FIG. 3A), the servo motor 40 should be released and the second clutch 42 is kept opened. After which, the first clutch 31 is closed. Then, the operator can start the spindle motor 30 to conduct a lathing work. About the milling work (see FIG. 3B), the spindle motor 30 should be released first. Then, first clutch 31 is switched to the opened condition. The operator closes the second clutch 42 (that becomes closed) and then starts the servo motor 40. In this preferred embodiment, it is suitable for high rotating speed and high torque condition.

Figure 4:
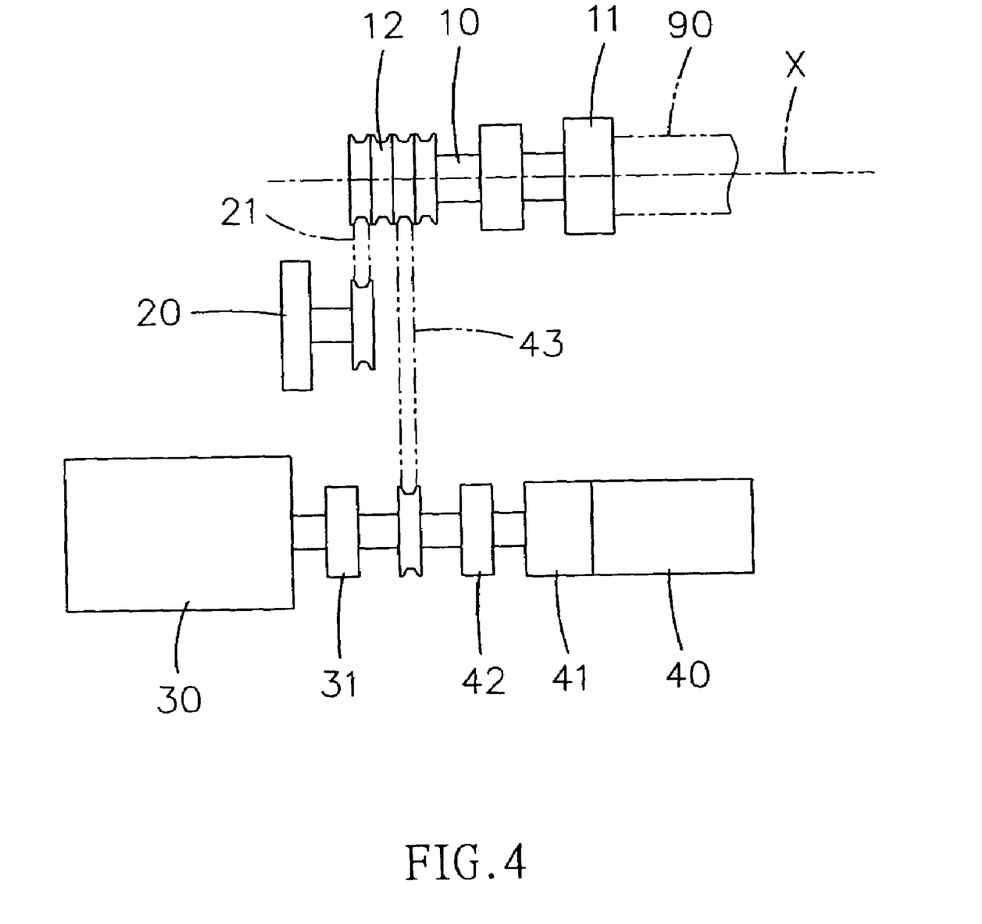
FIG. 4 is a schematic drawing showing the second preferred embodiment.

Referring to FIG. 4, it is the second preferred embodiment. In which, two driving timing belts 43A, 43B are reduced into only one, namely the driving timing belt 43. Also, the spindle motor 30 and the servo motor 40 are aligned on an axis. Similarly, it still can achieve the above-mentioned functions and advantages, so it is still in the protecting scope of this invention.

Figure 5:
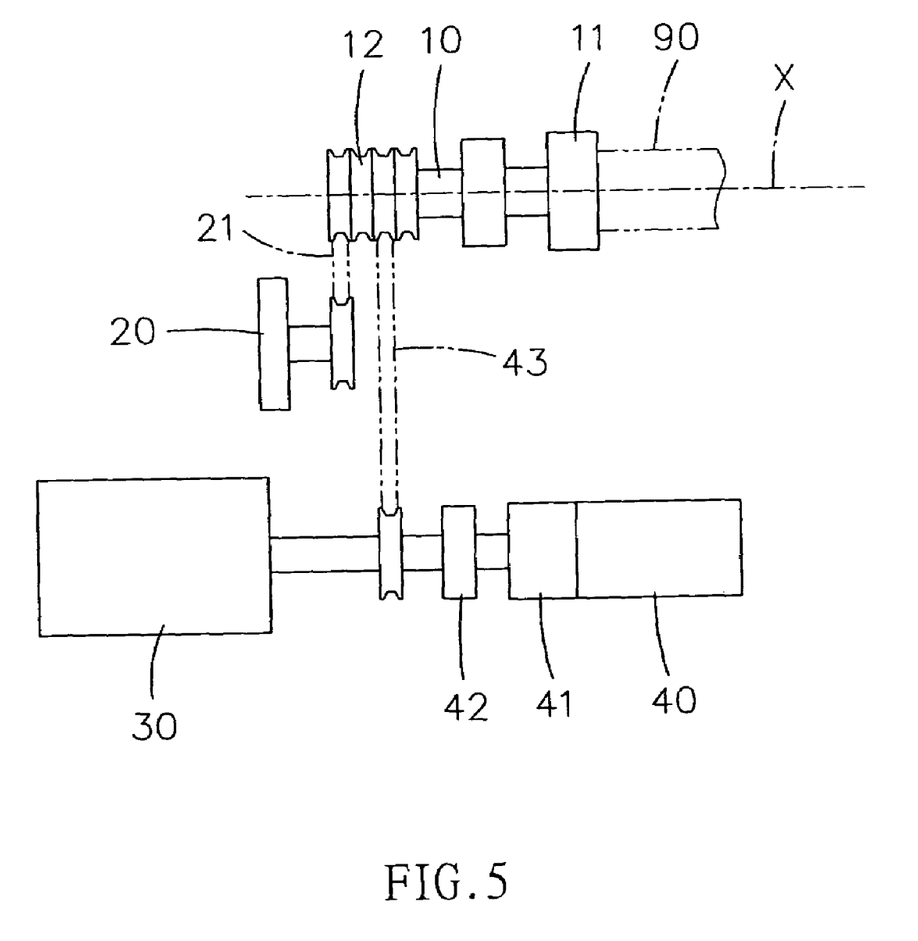
FIG. 5 is a schematic drawing showing the third preferred embodiment.

As shown in FIG. 5, it is the third preferred embodiment. The servo motor 40 still connects with said speed reduction mechanism 41 and the second clutch 42. But, the first clutch 31 that connects with the spindle motor 30 is omitted. The spindle motor 30 and the second clutch 42 connect with the transmission portion 12 via at least one driving timing belt 43. In addition, the speed reduction mechanism 41 can be the planetary gear reduction mechanism.

During the lathing work, the servo motor should be released and the second clutch 42 is opened (it means separated). After which, the operator can start the spindle motor 30. However, if the operator wants to switch to the milling (or drilling) work, the spindle motor 30 should be released first and makes the second clutch 42 closed. Then, this operator starts the servo motor 40 to continue the next work. In this embodiment, it is suitable for high rotation speed condition. However, it still can achieve the above-mentioned functions. So, it is still in the protecting scope of this invention.

Figure 6:
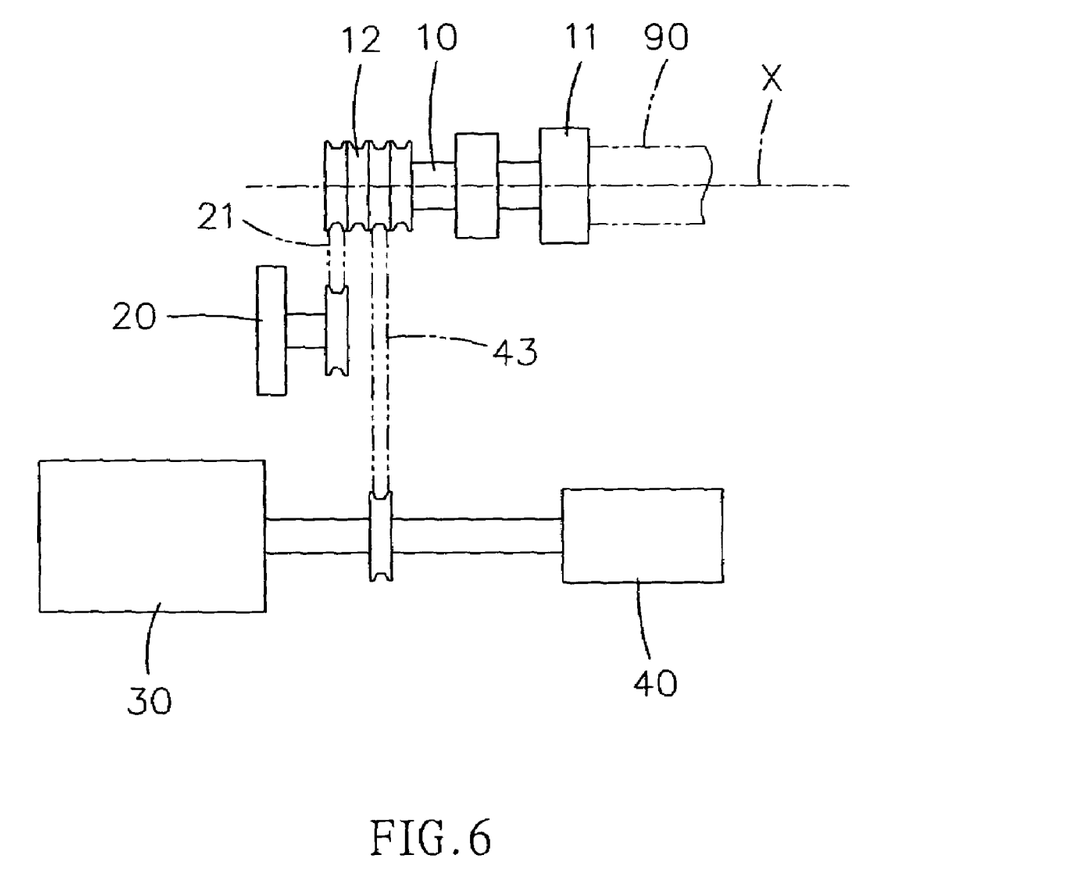
FIG. 6 is a schematic drawing showing the fourth preferred embodiment.

Referring to FIG. 6, it is the fourth preferred embodiment. The difference between the fourth one the third one is just to omit the speed reduction mechanism 41 and the second clutch 42. Under such condition, the spindle motor 30 and the servo motor 40 connect with the transmission portion 12 via at least one driving timing belt 43. Also, the transmission portion 12 is driven by at most one of the spindle motor 30 and the servo motor 40 at any time during operation. That is, both motors are kept released or only one motor is kept released. In this embodiment, it is suitable for low rotation speed condition. However, it still can achieve the above-mentioned functions. So, it is still in the protecting scope of this invention.

The advantages and functions of the present invention can be summarized as follows:

[1] Having a simple structure to achieve the clutching change function. In this invention, by utilizing the simple clutches and timing belts to easily switch to the lathing work (general machining) or the milling work (C-axis machining). The entire structure is quite simple.

[2] Saving more space. Because the timing belts connect the encoder, the spindle motor and the servo motor, the total volume of this CNC lathing and milling machine can be minimized. Thus, it can save more space.

[3] Reducing the manufacturing cost. Although this invention can achieve both the general lathing work and the precise C-axis machining work, the required elements still can be selected from existing lower-priced ones. In addition, it does not need the complicated worm and gear mechanism nor the expensive combined spindle motor (with the servo motor's function). So, it can significantly reduce the manufacturing cost.

The above embodiments are only used to illustrate the present invention, not intended to limit the scope thereof. Many modifications of the above embodiments can be made without departing from the claim(s) of the present invention.

What is claimed is:

1. A C-axis driving device of a computer numerical controlled lathing and milling machine comprising:
   a spindle having a clamping device and a transmission portion;
   an encoder connecting with said transmission portion via an auxiliary timing belt;
   a spindle motor and a servo motor connecting with said transmission portion via at least one driving timing belt, said transmission portion being driven by at most one of said spindle motor and said servo motor at any time during operation.

2. The C-axis driving device of a computer numerical controlled lathing and milling machine as defined in claim 1, wherein
   said servo motor is disposed with a speed reduction mechanism and a second clutch;
   said servo motor and said second clutch connecting with said transmission portion via at least one driving timing belt.

3. The C-axis driving device of a computer numerical controlled lathing and milling machine as defined in claim 2, wherein said speed reduction mechanism is a planetary gear reduction mechanism.

4. The C-axis driving device of a computer numerical controlled lathing and milling machine as defined in claim 1, wherein
   said spindle motor connecting with a first clutch;

said servo motor connecting with a speed reduction mechanism and a second clutch;

said first clutch and said second clutch connecting with said transmission portion via at least one driving timing belt; only at most one of said first clutch and said second clutch keeping closed.

5. The C-axis driving device of a computer numerical controlled lathing and milling machine as defined in claim 4, wherein said at least one driving timing belt connecting said first clutch and said second clutch with said transmission portion contains two driving timing belts, said first clutch connects with one of said two driving timing belts and said second clutch connects with the other of said two driving timing belts.

6. The C-axis driving device of a computer numerical controlled lathing and milling machine as defined in claim 4, wherein said spindle motor and said servo motor are aligned on an axis; and said first clutch and said second clutch connecting with said at least one driving timing belt connecting said first clutch and said second clutch with said transmission portion.

7. The C-axis driving device of a computer numerical controlled lathing and milling machine as defined in claim 4, wherein said speed reduction mechanism is a planetary gear reduction mechanism.

* * * * *